(12) United States Patent
Harris

(10) Patent No.: US 11,472,647 B2
(45) Date of Patent: Oct. 18, 2022

(54) TRUCK DUMPER DUST CONTROL

(71) Applicant: Air-Cure Incorporated, Minneapolis, MN (US)

(72) Inventor: Michael R. Harris, Andover, MN (US)

(73) Assignee: Air-Cure Incorporated, Minneapolis, MN (US)

( * ) Notice: Subject to any disclaimer, the term of this patent is extended or adjusted under 35 U.S.C. 154(b) by 0 days.

(21) Appl. No.: 17/335,730

(22) Filed: Jun. 1, 2021

(65) Prior Publication Data

US 2021/0292114 A1   Sep. 23, 2021

Related U.S. Application Data

(60) Continuation of application No. 16/855,586, filed on Apr. 22, 2020, now Pat. No. 11,027,932, which is a continuation of application No. 16/421,880, filed on May 24, 2019, now Pat. No. 10,662,008, which is a continuation of application No. 15/415,988, filed on Jan. 26, 2017, now Pat. No. 10,351,365, which is a continuation of application No. 14/454,897, filed on Aug. 8, 2014, now Pat. No. 9,598,249, which is a division of application No. 13/099,492, filed on May 3, 2011, now Pat. No. 8,827,622.

(60) Provisional application No. 61/330,777, filed on May 3, 2010.

(51) Int. Cl.
  *B65G 67/40* (2006.01)
  *B65G 69/18* (2006.01)
  *B65G 67/32* (2006.01)

(52) U.S. Cl.
  CPC .......... *B65G 69/186* (2013.01); *B65G 67/32* (2013.01); *B65G 67/40* (2013.01); *B65G 69/181* (2013.01)

(58) Field of Classification Search
  CPC .............................. B65G 67/40; B65G 69/186
  See application file for complete search history.

(56) References Cited

U.S. PATENT DOCUMENTS

| | | | | |
|---|---|---|---|---|
| 2,578,849 A * | 12/1951 | Small | ...................... | B65G 67/00 414/580 |
| 3,301,415 A * | 1/1967 | Kunzler | ................. | B65G 67/00 414/362 |
| 5,360,308 A * | 11/1994 | Hansen | ................... | B65G 67/40 414/415 |
| 6,019,568 A * | 2/2000 | Bratlie | ................... | B65G 67/30 414/583 |
| 6,402,451 B1 * | 6/2002 | Brown | ...................... | B60P 1/28 414/583 |
| 2003/0044263 A1 * | 3/2003 | Hall | ....................... | B65G 67/50 414/362 |

* cited by examiner

*Primary Examiner* — Jonathan Snelting
(74) *Attorney, Agent, or Firm* — Patterson Thuente Pedersen, P.A.

(57) ABSTRACT

A truck dumper including a material receiving hopper, a tilt table configured to dump a load from the truck or truck trailer into the material receiving hopper. The invention includes a stilling shed positioned above the material receiving hopper and at least one curtain baffle suspended below the roof of the stilling shed. The curtain baffles are positioned such that there is a gap located near the roof and an upper margin of the at least one curtain baffle through which air can flow. The invention further includes an air exhaust structure configured to exhaust dust laden air from the interior of the stilling shed.

18 Claims, 7 Drawing Sheets

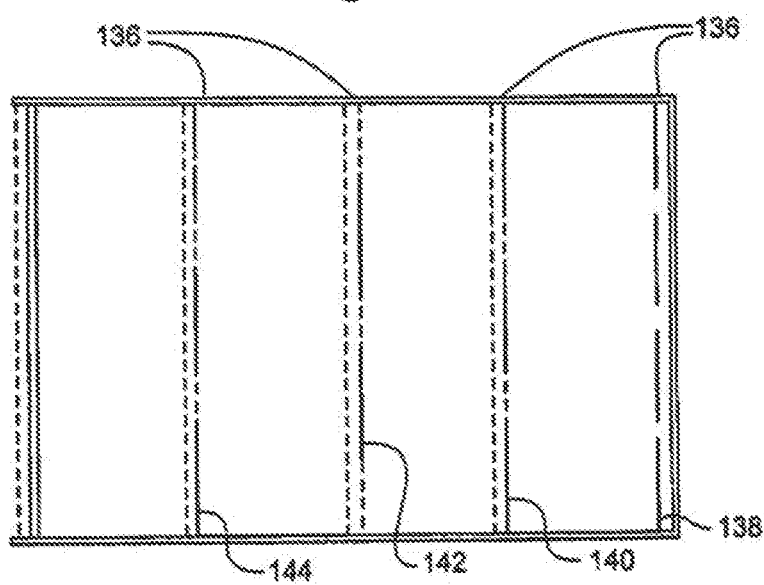

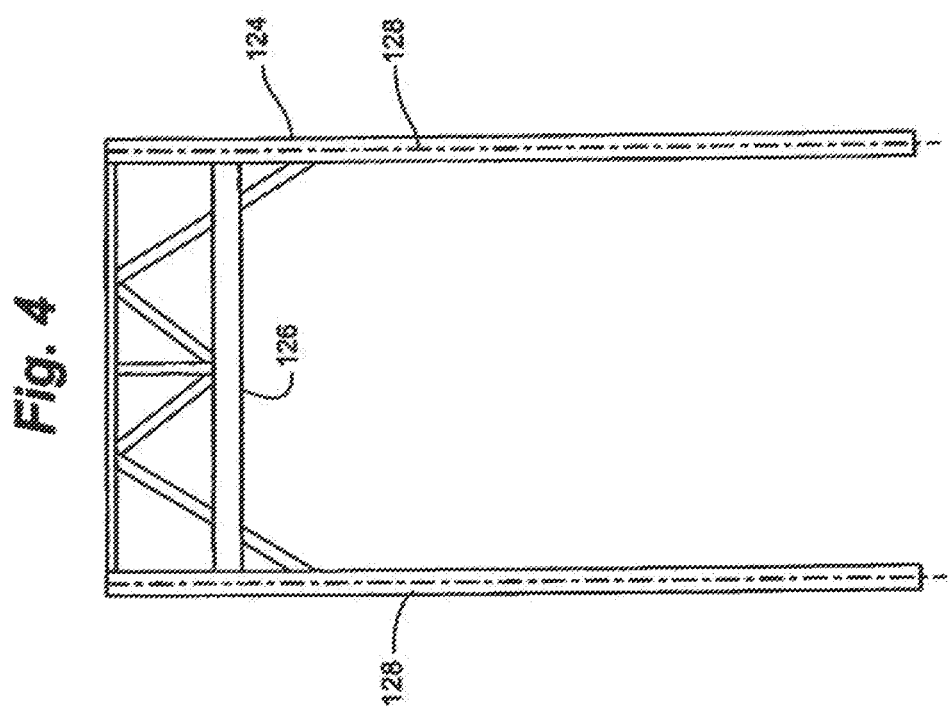

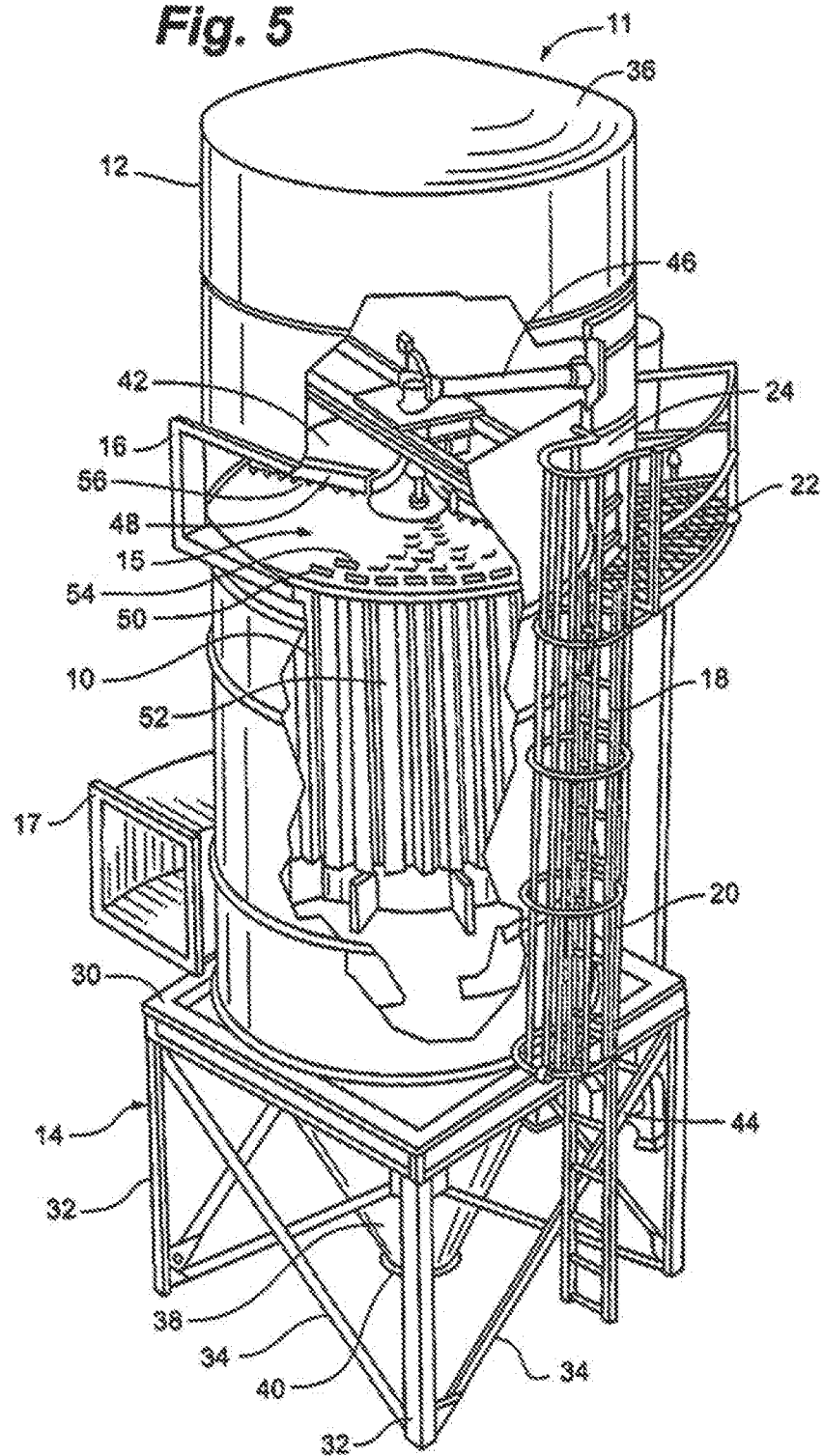

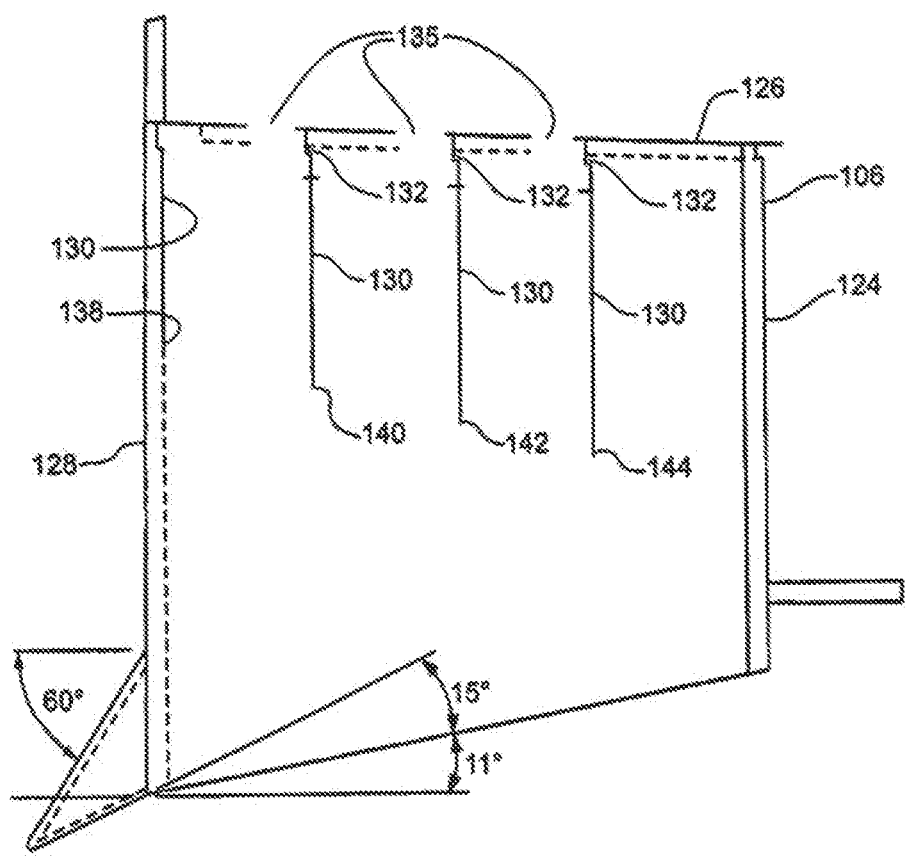

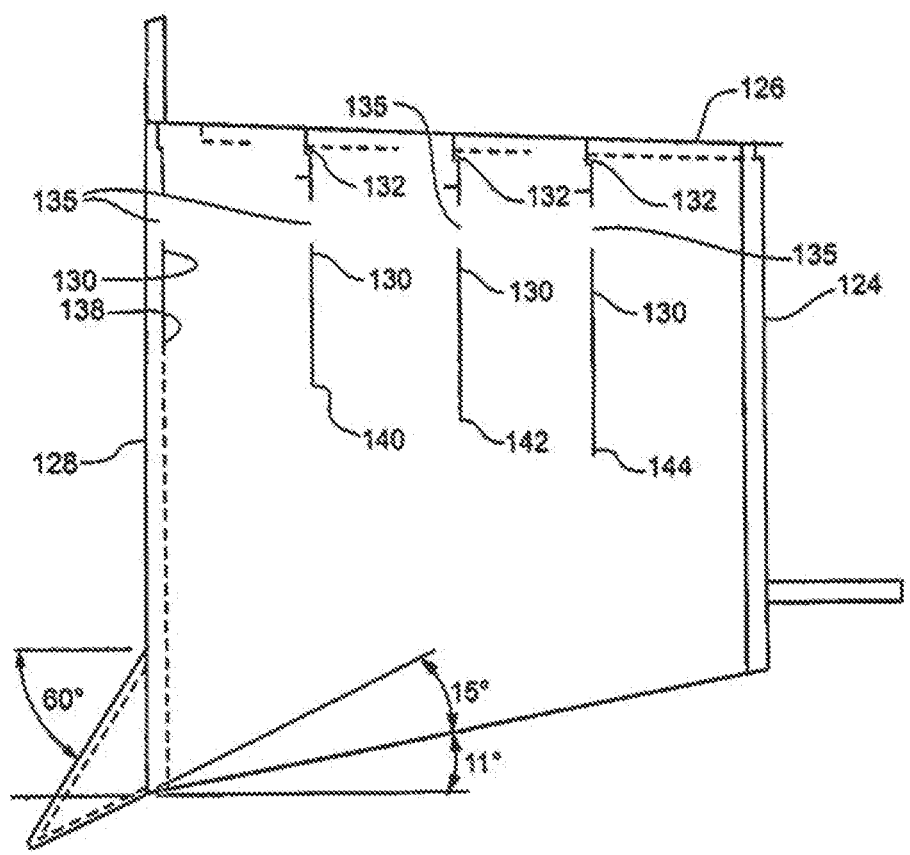

TRUCK DUMPER DUST CONTROL

CROSS-REFERENCE TO RELATED APPLICATION

This application is a continuation U.S. patent application Ser. No. 16/855,586, filed Apr. 22, 2020, entitled "Truck Dumper Dust Control," which in turn is a continuation of U.S. patent application Ser. No. 16/421,880, filed May 24, 2019, entitled "Truck Dumper Dust Control," now U.S. Pat. No. 10,662,008, issued on May 26, 2020, which in turn is a continuation of U.S. patent application Ser. No. 15/415,988, filed Jan. 26, 2017, entitled "Truck Dumper Dust Control," now U.S. Pat. No. 10,351,365, issued Jul. 16, 2019, which in turn is a continuation of U.S. patent application Ser. No. 14/454,897, filed Aug. 8, 2014, entitled "Truck Dumper Dust Control", now U.S. Pat. No. 9,598,249, issued Mar. 21, 2017, which in turn is a divisional of U.S. patent application Ser. No. 13/099,492, filed May 3, 2011, entitled "Truck Dumper Dust Control", now U.S. Pat. No. 8,827,622, issued Sep. 9, 2014, which claims the benefit of U.S. Provisional Application No. 61/330,777 entitled "Truck Dumper Dust Control", filed May 3, 2010, the entire contents of all of which are incorporated by reference.

TECHNICAL FIELD

The invention relates generally to truck dumpers that are used to empty trucks of their loads. More particularly, the invention relates to the control of dust that is generated by the unloading of trucks by truck dumpers.

BACKGROUND

Woodchips or brush chips have been used in the paper manufacturing industry as well as in the manufacturing of particle board and oriented strand board for many years. For the purposes of this application, the terms "woodchips" and "biomass" should be considered to include woodchips, brush chips and other forms of biomass that are harvested from forests and wooded areas as well as crops that are grown with the specific intent for the crops to be harvested for biomass. Woodchips are commonly produced from forest products that are too small to be used for the production of lumber and are used as raw materials for the production of paper pulp in the paper industry as well as in the production of particle board and oriented strand board as mentioned above. Woodchips are commonly transported by truck. Trucks are used because of the necessity of being able to get the transportation vehicle into the woods or other areas where the woodchips are produced. The wooded locations where woodchips are produced are often remote and subject to regular relocation as the trees or brush that are converted to woodchips are harvested. Thus, trucks are the preferred transportation mode for woodchip transport.

Woodchips have a relatively low density as compared to other granular materials that are commonly transported by truck. Coal, gravel and sand are much denser and are commonly transported by dump trucks. Woodchips, because of their low density and the fact that they commonly have irregular sharp edge shapes, do not flow from the inside of a dump truck bed as readily as do coal, gravel or sand. Further, woodchips contain moisture and are often harvested in winter. The moisture and low winter temperatures can cause the woodchips to freeze to each other and to the inside of the truck and be difficult to remove from the truck. Biomass materials may also bridge the width of the truck and impede unloading.

To dump woodchips from a dump truck it is necessary to raise the truck bed to an extreme angle as compared to the angle sufficient to dump denser materials from a truck. When this is done in the context of longer truck beds such as semi-trailers, the extreme angle to which the truck bed is raised creates a serious risk that the raised truck bed will topple to one side or the other creating a safety hazard as well as the possibility of damage or destruction of the truck. Accordingly, truck dumpers are commonly used to empty trucks that are used to transport woodchips or other biomass materials.

A truck dumper includes a large tilt bed onto which the semi-trailer containing woodchips is positioned. Some truck dumpers operate by tilting only the semi-trailer uncoupled from its tractor, while other truck dumpers lift the entire tractor-trailer rig together for dumping.

The trailer is secured to the tilting bed platform, for example by clamps, and the tilting platform is raised, typically by hydraulic rams, to a position approaching vertical so that gravity can cause the contained woodchips or other biomass materials to exit the back of the truck bed.

Some truck dumpers permit the truck to be driven onto the tilt bed in a forward direction while others require that the truck be backed onto the tilt bed.

In the paper mill, particle board and oriented strand board industries, it is common to control the dust that arises from the dumping of woodchips or other biomass by spraying water to clear the dust from the air and cause the dust to sink to the ground. In these industries, the woodchips or other biomass are processed in such a way that added moisture is required. So, the addition of water for dust control does not cause a problem and may be a benefit to the production process.

More recently, it has become desirable to burn woodchips or other biomass for the production of electrical energy at power plants. Usually, the woodchips or biomass are added to coal that is burned to generate energy. Because biomass is a renewable resource, it is desirable to substitute it, at least partially, for fossil fuels such as coal. Biomass may also come from crop residues, dedicated energy production crops, forest and wood processing waste, livestock and poultry waste and urban waste as well as food processing residues. The addition of 15% biomass to coal burned for the production of electrical energy benefits the energy production industry because the carbon emissions created by this combination are considered to be no more than that of natural gas.

In the context of burning biomass for energy, it is undesirable to use water to control dust because it makes the biomass more difficult to burn, reduces BTU content of the biomass and because moisture in the biomass tends to increase the likelihood of spontaneous combustion because the biomass is stored in a relatively dry state. Spontaneous combustion is generally not a problem in the paper pulp, particle board or oriented strand board industries because the woodchips or biomass are commonly stored in a semi-liquid slurry where the moisture level is too high to permit spontaneous combustion.

In addition, wood dust entrained in the air can lead to a dust explosion. As discussed above wood and wood dust has a low density and floats in the air more readily than coal dust. When the concentration of wood dust is right a source of ignition can lead to devastating explosion.

Further, the cellulose particles in wood dust are an environmental pollutant and if breathed can contribute to health problem in individuals exposed.

SUMMARY

Accordingly, there has arisen a need to control the dust that is created when dumping woodchips or other biomass with a truck dumper, particularly at power plants. Controlling this dust creates an environmental benefit, protects the safety of workers in the area and reduces the risk of spontaneous combustion and of dust explosion occurring because of the woodchip dust being entrained in air.

A truck dumper dust control system in accordance with the present invention generally includes a tilt table, a receiving hopper, a stilling shed and a dusty air exhaust system.

The tilt table generally includes a platform upon which a loaded truck or semi-trailer is positioned for tilting and dumping. As discussed above, self-dumping trucks are not utilized for woodchip transport because of the high angle required to get the woodchips to exit the truck bed storage compartment. The platform may be structured to receive and support a semi-trailer, a semi-trailer and tractor or a non-articulated truck. The semi-trailers utilized for transporting woodchips are longer and taller than other bulk transport semi-trailers to accommodate a volume of woodchips having a similar weight to a load of rock or coal. This contributes to efficiency of transport. Semi-trailers utilized to haul woodchips are typically about 40 feet long with a 10 foot side wall.

The platform also includes a holding device to hold the truck or trailer in place on the platform. The holding device may incorporate bumpers to prevent sideways falling over of the trailer as well as clamps to grip the truck or trailer structure.

The platform is equipped with hydraulic rams or another means of lifting the platform to tilt it. Typically, the platform and hydraulic rams are structured to tilt the platform from a horizontal position to an angle of at least sixty-five to seventy degrees to facilitate the exit of the woodchips or other biomass from the truck.

Side panels may be secured to the platform near the rear end of the truck to minimize dust dispersion by a crosswind or cross air flow across the platform and truck during the dumping process according to one embodiment of the invention.

The receiving hopper is an enclosure into which the woodchips or biomass are dumped upon exiting the tilted truck. In accordance with the invention, the receiving hopper is of an appropriate size to receive the load of woodchips or biomass without significant excess space.

Typically, the receiving hopper is coupled to a conveyor which transports the woodchips or biomass from the receiving hopper to the processing facility.

In accordance with the invention, a stilling shed is erected above the receiving hopper. The stilling shed includes, for example, three walls and a roof. The roof may include a support truss over the opening of the stilling shed. In some embodiments of the invention, an articulated hydraulic arm may be installed on the top of the stilling shed to assist in freeing woodchips from the truck bed compartment that may have frozen or otherwise not exited the truck. The articulated hydraulic arm may include a pneumatic or hydraulic hammer at its end to free stubbornly stuck or frozen biomass from the truck bed. The articulated arm may be operated from an operator's cab or remotely from another location.

The opening of the stilling shed is sized to receive the rear end and upper portion of the truck when the truck is in the upright tilted position for emptying. The opening allows little space between the truck bed and the sides and top of the stilling shed.

In accordance with an example embodiment of the present invention, a series of curtain baffles hang from the roof of the stilling shed. The curtain baffles may be flexible and can be made of rubber or other flexible material. The curtain baffles are positioned near the opening of the stilling shed and positioned so that at least one of the curtain baffles contacts the upper portion of the truck bed when the truck is in the tilted emptying position.

In accordance with an example embodiment of the invention, the curtain baffles may be arranged in staggered rows and there may be a space between the upper margin of the curtain baffles and the roof of the stilling shed. The space between the upper margin of the curtain baffles permits the passage of airflow from the ambient atmosphere into the stilling shed. The passage of inflow of air through the space assists the transport of dust laden air that arises from shifting, tumbling and sliding of the biomass as it exits the truck bed. Alternately the baffles may reach the roof of the stilling shed and an opening in the roof of the stilling shed may be present to permit the passage of airflow from the ambient atmosphere into the stilling shed. In a further alternative the baffle may extend to meet the roof of the stilling shed and an opening of slot may be present in the baffle itself to permit the inflow of ambient air.

In one embodiment of the invention, this gap between the upper margin of the curtain baffles and the roof may be approximately six inches or fifteen centimeters. The curtain baffles are positioned so that woodchips or other biomass that contact the surface of the baffles slide down the face of the baffles into the receiving hopper. The volume of the stilling shed is minimized to reduce the volume of air that needs to be exhausted to create an air change within the stilling shed. An opening in the roof of the stilling shed or through the baffle itself may be of similar size.

The minimization of volume is important in the invention because a larger volume in the stilling shed permits a longer residence time for dust within the stilling shed for a given air evacuation and filtration capacity. A longer residence time of the dust air mixture creates a greater possibility of escape of dust laden air or of ignition of the dust-air mixture.

The dusty air exhaust structure generally includes ductwork to carry dusty air from the stilling shed and receiving hopper to a bag house where the dusty air is filtered so that the dust is captured. The dusty air exhaust structure also includes a blower to draw clean air through the bag house into the environment.

In accordance with the present invention, it has been observed that the capture velocities for wood dust are different from other materials such as coal dust or rock dust. Because of its low density, wood dust floats more readily in the air and creates a greater danger of dust explosion if the source of ignition becomes available when the dust is entrained in the air.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3 is a plan view of an arrangement of baffles according to an example embodiment of the invention;

FIG. 4 is a sectional view of the opening of a stilling shed according to an example embodiment of the invention;

FIG. 5 is a partial cut away perspective view of a bag house according to an embodiment of the invention;

FIG. 6 is a sectional view of stilling shed according to another example embodiment of the invention; and FIG. 7 is a sectional view of stilling shed according to another example embodiment of the invention.

Figure 1:
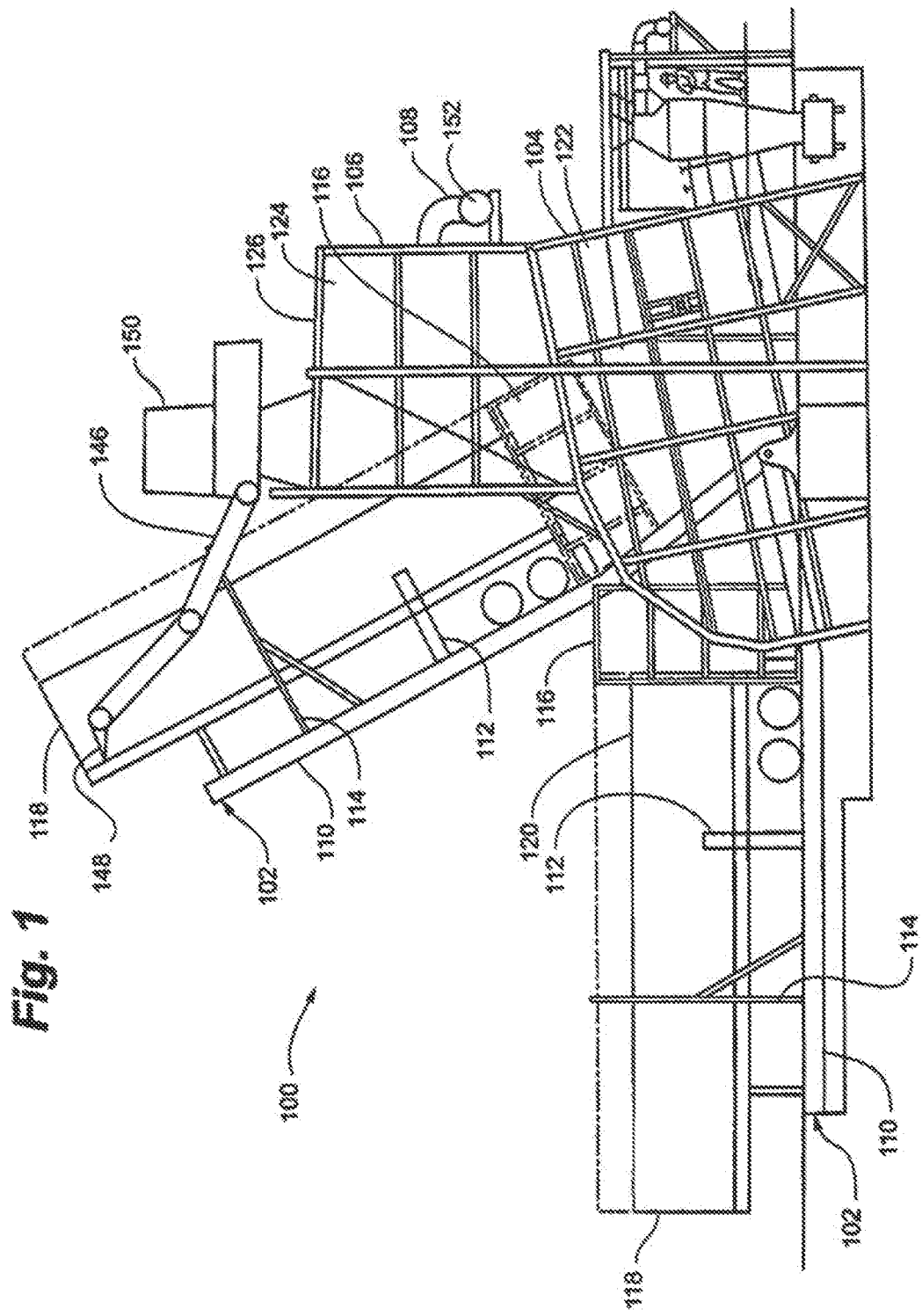
FIG. 1 is an elevational view of a truck dumper dust control facility depicting a tilt table in both a horizontal and an elevated dumping position according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, truck dumper 100, in accordance with the present invention, generally includes tilt table 102, receiving hopper 104, stilling shed 106 and dusty air exhaust 108.

In one embodiment of the invention, tilt table 102, which is depicted in FIG. 1 both in a horizontal orientation and an elevated tilted orientation, generally includes platform 110, holding device 112, bumpers 114 and side panels 116. Platform 110 is typically constructed of structural steel or another high strength material and is appropriately sized to receive a truck or truck trailer 118. Holding device 112 secures truck or truck trailer 118 to platform 110 during the dumping process so that truck or truck trailer 118 is inhibited from falling sideways. Bumpers 114 may be provided to additionally secure truck or truck trailer 118 to platform 110.

Side panels 116 are secured to platform 110 near the location where the rear end 120 of truck or truck trailer 118 is positioned on platform 110. Side panels 116 extend upwardly from platform 110 approximately the height of truck or truck trailer 118. Side panels 116 extend rearwardly from rear end 120 of truck or truck trailer 118 toward receiving hopper 104.

Receiving hopper 104 is dimensioned to receive the contents of truck or truck trailer 118 without substantial excess space. Receiving hopper 104 is generally conventional and includes Enclosure 122 and a conveyor (not shown). Conveyor (not shown) is coupled to a processing facility to which the biomass is directed.

Referring also to FIGS. 2-5, stilling shed 106 is positioned generally above receiving hopper 104. Stilling shed 106 generally includes three walls 124 and roof 126. Referring particularly to FIG. 4, stilling shed 106 defines opening 128, which is sized to receive the rear end of truck or truck trailer 118 as can be seen in FIG. 1. The volume of stilling shed 106, in accordance with the invention, is minimized to reduce the need for air exchange. The volume of stilling shed 106 should be large enough to contain a dust cloud generated by dumping but not substantially larger.

Figure 2:
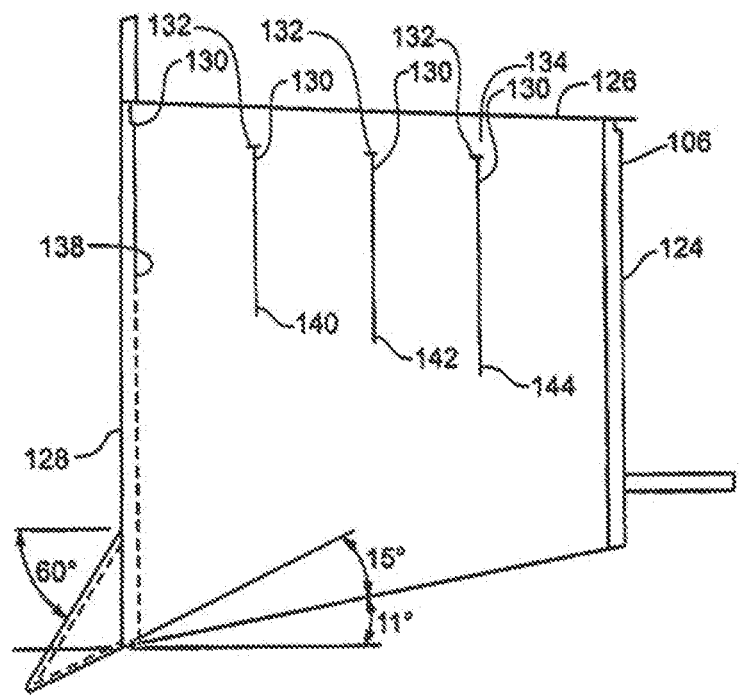
FIG. 2 is a sectional view of stilling shed according to an example embodiment of the invention.

Referring to FIGS. 2, 3 and 5, stilling shed 106 includes one or more curtain baffles 130. Curtain baffles 130 are suspended from roof 126 of stilling shed 106 and, in accordance with one embodiment of the invention, are suspended such that space 134 is present between upper margin 132 of curtain baffles 130 and roof 126. Space 134 permits the passage of air above curtain baffles 130. Referring to FIG. 5, alternately, opening 135 in roof 126 near the location at which each curtain baffles 130 is suspended from roof 126 may permit passage of air into stilling shed 106. In a further example embodiment of the invention depicted in FIG. 7, opening 135' may be present in curtain baffles 130.

Referring to FIGS. 2, 3 and 5, in an example embodiment of the invention, curtain baffles 130 are arranged in four staggered rows 136. Rows 136 include first row 138, second row 140, third row 142 and fourth row 144.

Referring to FIGS. 2, 3 and 5, first row 138 of curtain baffles 130 are relatively closely spaced near opening 128. Second row 140 is staggered relative to first row 138 and curtain baffles 130 of second row 140 are spaced farther apart. Third row 142, in this example embodiment, includes two curtain baffles 130, staggered to fall within the gaps in second row 140. Fourth row 144, in this example embodiment, includes three curtain baffles 130 staggered similarly to second row 140.

Referring again to FIG. 2, curtain baffles 130 of rows 136 are of variable lengths. First row 138 being shortest, second row 140 being longer than first row 138, third row 142 being longer than second row 140 and fourth row 144 being longer than third row 142. At least some of Curtain baffles 130 are thus arranged to contact rear end 120 of truck or truck trailer 118 as the tilting process proceeds.

Stilling shed 106 may include on roof 126 thereof, an articulated hydraulic arm 146. Articulated hydraulic arm 146 may include hammer 148 to assist in freeing woodchips or other biomass that might not be emptied from truck or truck trailer 118 during tilting. Articulated hydraulic arm 146 may include operator's cab 150.

Dusty air exhaust 108 generally includes ductwork 152 and air filtration unit 11.

An example embodiment of air filtration unit 11 broadly includes plenum enclosure 12, base frame 14, air filtration assembly 15, filtered exhaust duct 16, and air intake duct 17. Access ladder 18 is surrounded by safety cage 20 and leads up to catwalk 22, providing access to plenum enclosure 12 through access door 24. Filtered exhaust duct 16 and air intake duct 17 may be attached to an integral with plenum enclosure 12. Air filtration assembly 15 is positioned within plenum enclosure 12. Plenum enclosure 12 is positioned on base frame 14.

Base 14 may include frame 30, legs 32, and braces 34. Base 14 may vary in size and proportion, depending on the size of the plenum enclosure 12 to be supported on base 14. Base 14 can be made of a variety of high strength, durable materials such as structural steel.

Plenum enclosure 12 may be a large, generally cylindrical structure, ranging from twenty-five to fifty feet in height. Plenum cover or roof 36 is positioned over plenum enclosure 12. Dust collection funnel 38 tapers downwardly toward dust discharge mouth 40. Funnel 38 is positioned underneath plenum enclosure 12, residing within the space below base frame 30 and between legs 32 and braces 34.

The air filtration assembly 15 is contained mainly within plenum chamber 42. Air filtration assembly 15 comprises an air pressure pump 44, pressurization nozzle input duct 46, nozzle arm 48, and numerous filter elements 50 having air permeable hanging filter media bags or socks 52 surrounding filter cages 54. In a typical large capacity air handling system, often employing multiple air filtration units 11, as many as twenty thousand filter bags 52 and twenty thousand wire filter cages 54 may be utilized. Air pressure pump 44 is connected to nozzle duct 46. Nozzle arm 48 is positioned beneath nozzle duct 46 and has suction nozzles 56 opening in a downwardly direction, directed toward bag mouths 58 of filter elements 50.

Filter media bags or socks 52 are attached to bag mouths 58. Bag mouths 58 are positioned below bag nozzles 56. Bag mouths 58 rest on and are supported by bag hanger deck 62. Filter media bags 52 are positioned over and supported by wire filter cages 54. Unfiltered air enters air filtration unit 11 through intake duct 17 so as to be processed through air filtration assembly 15. Filtered air is expelled from air filtration unit 11 through filtered exhaust duct 16.

In operation, truck or truck trailer 118 loaded with woodchips or other biomass is backed onto platform 110 of tilt table 102 or otherwise positioned on platform 110 of tilt table 102. Truck or truck trailer 118 is secured by holding device 112 and bumpers 114. Tilt table 102 is lifting from a generally horizontal position to an angled position approximately 65-70 degrees from the generally horizontal position to dump the woodchips or other biomass from truck or truck trailer 118 into receiving hopper 104.

Side panels 116 inhibit cross air flow across the rear end 120 of truck or truck trailer 118 during the tilting process. Thus, side panels 116 minimize the dispersion of dust generated by the dumping process to the surrounding environment and maintain dust laden air in a location where it can be exhausted.

As truck or truck trailer 118 is tilted, truck or truck trailer 118 contacts at least one set of curtain baffles 130 or several of curtain baffles 130 sequentially. Truck or truck trailer 118 first contacts first row 138 then second row 140 and then third row 142 and finally fourth row 144. Curtain baffles 130 assist in containing dust laden air in stilling shed 106 and inhibit excessive tumbling of dust laden air in stilling shed 106. Dusty air exhaust 108 is operated to withdraw air from stilling shed 106 and receiving hopper 104 during the dumping process. Curtain baffles 130 assist in retaining dust laden air within stilling shed 106 and receiving hopper 104 until dusty air exhaust 108 is able to withdraw the dust laden air from the area within. Space 134 between upper margin 132 of curtain baffles 130 and roof 126 permits the intake of ambient air into stilling shed 106 to assist in carrying away dust laden air from stilling shed 106 and receiving hopper 104.

In the event that woodchips or biomass do not empty from truck or truck trailer 118 because of being lodged or frozen in truck or truck trailer 118. An operator may utilize articulated hydraulic arm 146 and hammer 148 to free to lodged woodchips or biomass from truck or truck trailer 118. In accordance with the invention, the internal volume of stilling shed 106 is controlled to provide a proper air exchange in order to deliver dust laden air to air filtration assembly 11 for filtration.

Minimization of the volume of stilling shed 106 assists in controlling the volume of dust laden air generated in the dumping process and permits control of the size and needed capacity of air filtration unit 11.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of emptying contents from a truck bed, comprising:
   driving a truck having the truck bed onto a truck dumper, the truck bed containing the contents to be emptied therefrom;
   positioning at least a rear portion of the truck bed at least partially in a stilling shed having a roof and sidewalls that also encloses a material receiving hopper of the truck dumper;
   raising the truck bed on the truck dumper to an angle sufficient to facilitate dumping the contents from the truck bed into the material receiving hopper of the truck dumper;
   placing a rear portion of the truck bed in contact with a first curtain baffle suspended within the stilling shed near a roof of the stilling shed wherein there is a gap located proximate a junction of a top margin of the curtain baffle and the roof; and exhausting dust laden air from the stilling shed to an air exhaust structure.

2. The method as claimed in claim 1, further comprising positioning the rear portion of the truck bed to at least partially enclose the rear portion of the truck bed between panels to inhibit a cross flow of air proximate the rear portion of the truck bed and an opening of the stilling shed.

3. The method as claimed in claim 1, wherein the first curtain baffle comprises a first row of curtain baffles and the method further comprising placing the rear portion of the truck bed in contact with further second and third rows of curtain baffles within the stilling shed proximate a gap located near a junction of a top margin of the second and third rows of curtain baffle and the roof.

4. The method as claimed in claim 3, further comprising placing the rear portion of the truck bed in contact with the first, second and third rows of curtain baffles staggered relative to each other.

5. The method as claimed in claim 3, further comprising placing the rear portion of the truck bed in contact with the first row of curtain baffles that is of a different length vertically from the third row of curtain baffles and placing the rear portion of the truck bed in contact with the third row of curtain baffles that is longer than the first row of curtain baffles.

6. The method as claimed in claim 1, further comprising placing the rear portion of the truck bed in the stilling shed while substantially minimizing the volume of the stilling shed.

7. The method as claimed in claim 1, further comprising operably coupling a power hammer to the truck dumper whereby a portion of the contents of the actual bed can be freed if lodged.

8. The method as claimed in claim 1, further comprising placing the rear portion of the truck bed in the stilling shed while locating the gap near the junction of the roof and the upper margin of the at least one curtain baffle such that the gap comprises a space defined between the upper margin of the at least one curtain baffle and the roof.

9. The method as claimed in claim 1, further comprising placing the rear portion of the truck bed in the stilling shed while locating the gap near the junction of the roof and the upper margin of the at least one curtain baffle such that the gap comprises an opening defined by the roof near the upper margin of the at least one curtain baffle.

10. The method as claimed in claim 1, further comprising placing the rear portion of the truck bed in the stilling shed proximate the gap near the junction of the roof and the upper margin of the at least one curtain baffle such that the gap comprises an opening defined by the at least curtain baffle near the upper margin of the at least one curtain baffle.

11. The method as claimed in claim 1, further comprising placing the rear portion of the truck bed in the stilling shed proximate side panels secured to a platform near the rear end of the truck bed to minimize dust dispersion by a cross airflow during the dumping process.

12. The method as claimed in claim 1, further comprising placing the rear portion of the truck bed in the stilling shed at least partially enclosed by three walls and a roof.

13. The method as claimed in claim 1, further comprising, placing the rear portion of the truck bed in contact with the curtain baffles that are flexible and made from rubber or another flexible material.

14. The method as claimed in claim 1, further comprising placing the rear portion of the truck bed in the stilling shed proximate an opening in a roof of the stilling shed adjacent the first curtain baffle that facilitates the passage of air flow from the ambient atmosphere into the stilling shed.

15. The method as claimed in claim 1, further comprising placing the rear portion of the truck bed in the stilling shed proximate an opening through the first curtain baffle near a roof of the stilling shed to facilitate inflow of ambient air.

16. The method as claimed in claim 1, further comprising placing the rear portion of the truck bed in the stilling shed in contact with the first curtain baffle proximate a space between the upper margin of the curtain baffle and a roof the stilling shed to facilitate in the flow of ambient air.

17. The method as claimed in claim 1, further comprising exhausting the dust laden air from the stilling shed to the air exhaust structure utilizing a capture velocity adapted for capture of wood dust which accommodates a low density of wood dust.

18. The method as claimed in claim 1, further comprising, if the truck is a semi-truck leaving a trailer portion that includes the truck bed on the truck dumper while removing a tractor portion of the semi-truck from the truck dumper.

* * * * *